Patented Apr. 1, 1930

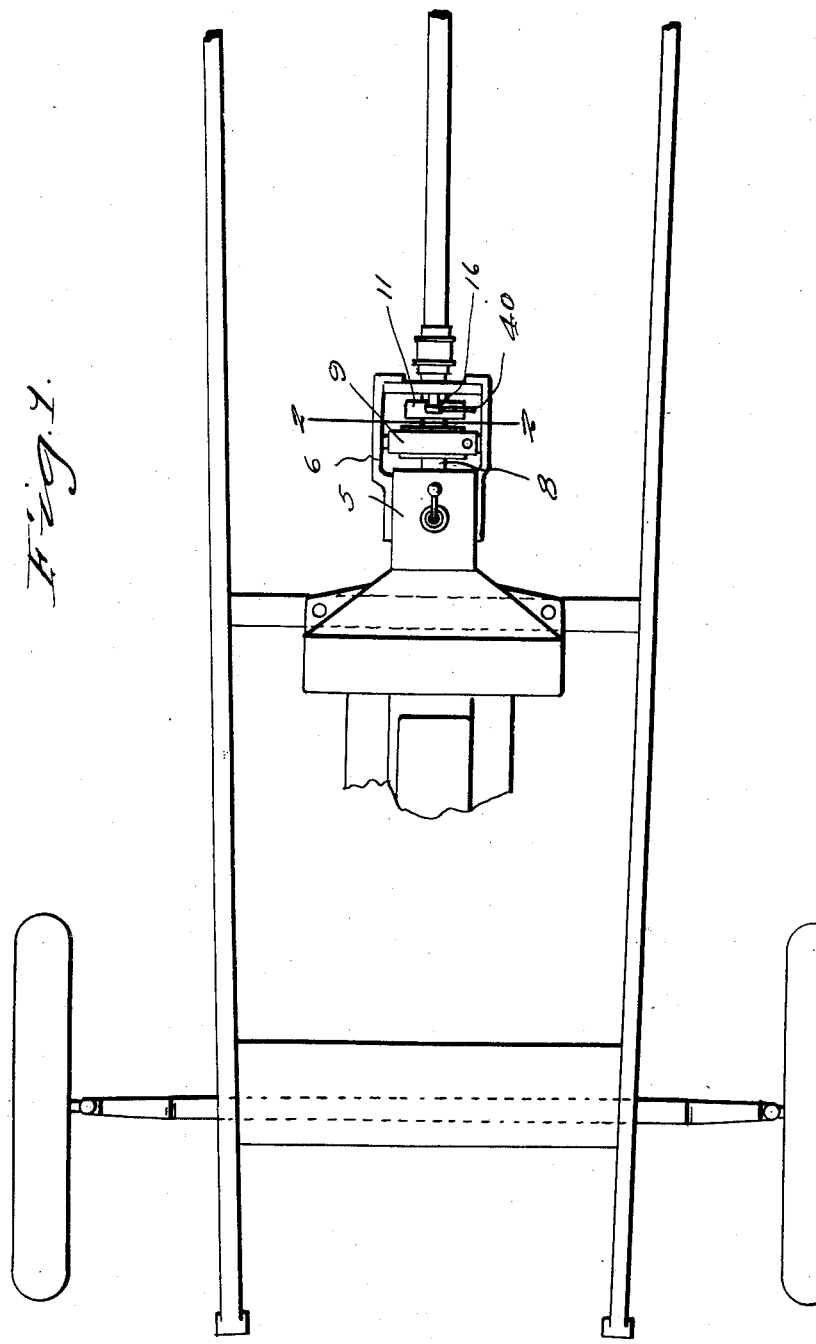

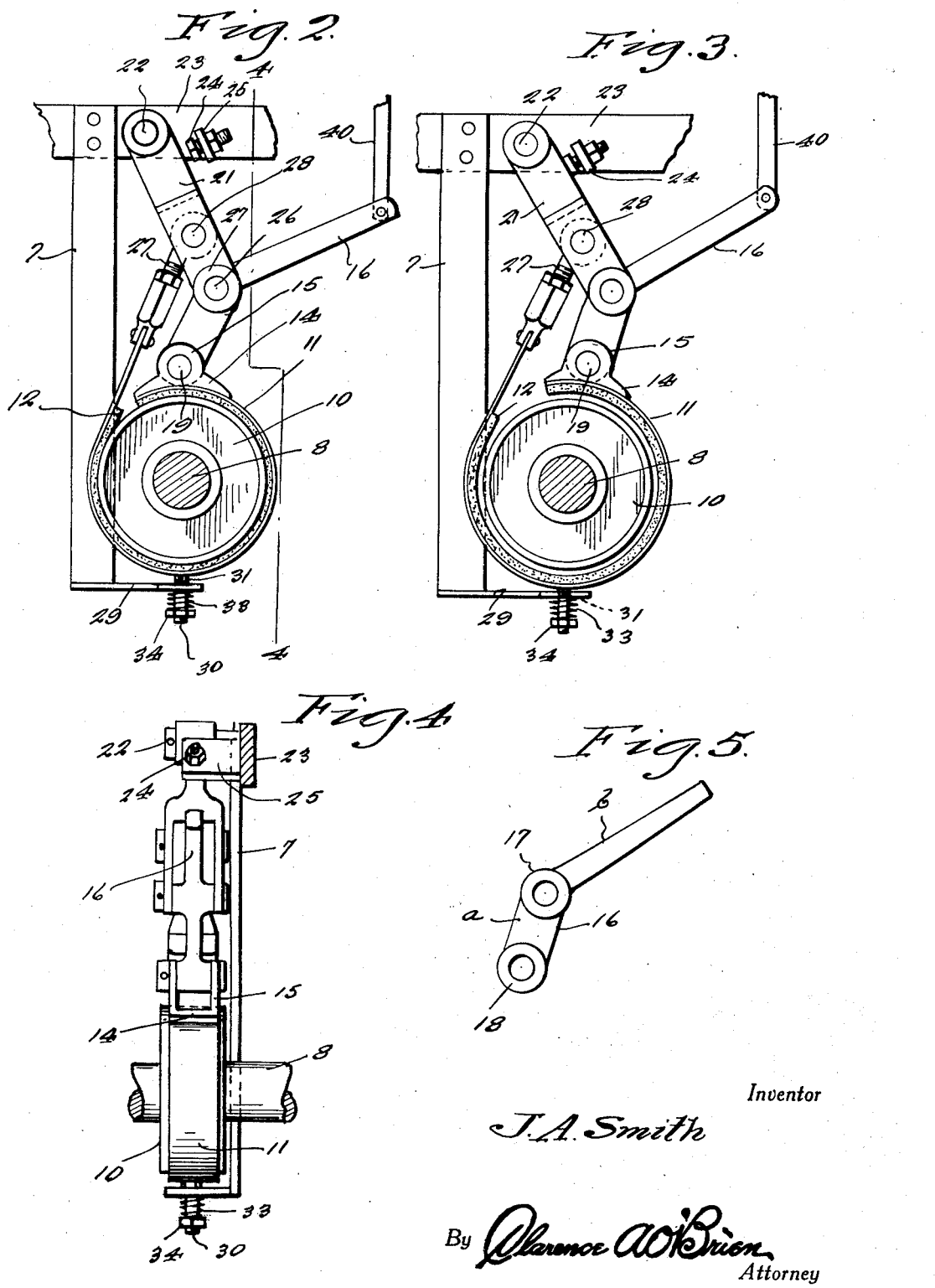

1,752,618

UNITED STATES PATENT OFFICE

JOHN A. SMITH, OF CORNWALL, ONTARIO, CANADA

BACK-UP BRAKE FOR VEHICLES

Application filed May 2, 1929. Serial No. 359,879.

The present invention relates to a back-up brake which is more particularly designed for use on automobiles and other vehicles to prevent the same from backing down hill even when the power of the engine gives out or is insufficient to propel the vehicle up hill, or for other cause, thereby preventing injury to the vehicle and also to the passengers as has frequently occurred in the past under such circumstances.

An important object of the invention is to provide a back-up brake of this character which is simple and comparatively inexpensive in construction to install, which is reliable and efficient in operation, and which can be applied to automobiles as now constructed without requiring any material change in design on receiving my improvement.

Another very important object of my invention resides in the provision of a back-up brake of this character which may be mounted for operation on the drive shaft of the automobile so that the one brake will be sufficient and have means incorporated therein whereby the brake may be easily and readily released when it is desired to actually back up the automobile.

With the above and numerous other objects in view, as will appear as the description proceeds, the invention resides in certain novel features of construction and in the combination and arrangement of parts as will be hereinafter more fully described and claimed.

In the drawing:

Figure 1 is a fragmentary top plan view of an automobile chassis showing my improved brake structure incorporated therein.

Figure 2 is a sectional view, taken on the line 2—2 of Figure 1.

Figure 3 is a similar view showing the brake released.

Figure 4 is a sectional view, taken substantially on the line 4—4 of Figure 2, and Figure 5 is a detail elevation of the releasing bell crank lever.

Referring to the drawing in detail, it will be seen that the numeral 5 denotes an automobile transmission casing with a pair of rearwardly extending arms secured to the sides thereof and having hangers 7 depending therefrom. The numeral 8 denotes the drive shaft extending from the transmission casing and having the emergency brake structure 9 mounted thereon. My brake structure is preferably mounted immediately to the rear of the emergency brake structure.

Referring now in detail to my brake structure, it will be seen that the numeral 10 denotes the brake drum which is secured to the shaft 8. The numeral 11 denotes the brake band with lining 12 therein. A casting 14 is secured to one end of the brake band and includes the pair of spaced apertures 15. Numeral 16 denotes a bell crank lever with a relatively short arm $a$ and a relatively long arm $b$ and is formed with an eye 17 at the juncture of the arms $a$ and $b$ and with an eye 18 at the end of the arm $a$. The eye 18 is disposed between the apertured ears 15 and pivotally mounted therebetween by means of pin 19 passing through the eye 18 and the opposite ear 15. A link 21 is pivotally engaged as at 22 to a cross bar 23, between the rear extremities of the arms 6 and is limited in its swinging movement by an adjustable bolt valve 24 in an ear 25 projecting from the bar 23. A pivot pin 26 extends through the eye 17 and through the eyes 27 at the extremities of the furcations of the forked link 21. An adjustable link 27 is connected to the other end of the band 11 and is pivotally engaged on a pin 28 between intermediate portions of the furcations of the forked link 21. The hanger 7 from the bar 23 has a lateral arm 29 through which projects the bolt 30 pivotally engaged as at 31 with an intermediate or bottom portion of the band 11 and a spring 33 is disposed about the bolt 21 impinging against a nut 34 on the end thereof and the arm 29.

The shaft 8 as shown in Figures 2 and 3, of course rotates in a clockwise direction to propel the vehicle forwardly and such rotation of the drum 10 with the shaft 8 tends to release the band automatically from the drum, so that no braking action takes place, but should the vehicle attempt to back up and rotate the shaft 10 in a counterclockwise direction, this would cause the binding of the brake band on the drum and thus brake the vehicle.

To release the brake structure from operation, it is only necessary to pull upwardly on a rod 40 which may be accessible from a convenient point in the vehicle and thus swing the bell crank lever 16 to the position shown in Figure 3, thereby separating the band from the drum.

It is thought that the construction, operation, utility and advantages of this invention will now be quite apparent to those skilled in this art without a more detailed description thereof. The present embodiment of the invention has been described in detail merely for the purpose of exemplification, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. In combination, a shaft, a brake drum on the shaft, a brake band disposed about the drum, a casting on one end of the brake band, a bell crank lever pivotally engaged with the said casting, a link pivotally engaged with an intermediate portion of the bell crank lever, means pivotally mounting said link, an adjustable link engaged with the other end of the band and pivotally engaged with the intermediate portion of said first mentioned link.

2. In combination, a shaft, a brake drum on the shaft, a brake band disposed about the drum, a casting on one end of the brake band, a bell crank lever pivotally engaged with the said casting, a link pivotally engaged with an intermediate portion of the bell crank lever, means pivotally mounting said link, an adjustable link engaged with the other end of the band and pivotally engaged with the intermediate portion of said first mentioned link, a hanger, an arm projecting from the hanger under the lower portion of the brake band, a spring bolt slidably mounted in the arm and pivotally engaged with said lower portion of the brake band.

3. In combination, a shaft, a brake drum, on the shaft, a brake band disposed about the drum, a casting on one end of the brake band, a bell crank lever pivotally engaged with the said casting, a link pivotally engaged with an intermediate portion of the bell crank lever, means pivotally mounting said link, an adjustable link engaged with the other end of the band and pivotally engaged with the intermediate portion of said first mentioned link, a hanger, an arm projecting from the hanger under the lower portion of the brake band, a spring bolt slidably mounted in the arm and pivotally engaged with said lower portion of the brake band, adjustable stop means for limiting the swinging movement of the first mentioned link.

4. In combination, a shaft, a brake drum on the shaft, a brake band disposed about the drum, a casting on one end of the brake band, a bell crank lever pivotally engaged with the said casting, a link pivotally engaged with an intermediate portion of the bell crank lever, means pivotally mounting said link, an adjustable link engaged with the other end of the band and pivotally engaged with the intermediate portion of said first mentioned link, a hanger, an arm projecting from the hanger under the lower portion of the brake band, a spring bolt slidably mounted in the arm and pivotally engaged with said lower portion of the brake band, adjustable stop means for limiting the swinging movement of the first mentioned link, remote control means connected with said bell crank lever.

5. In combination, a transmission casing, a shaft extending from and operatively connected with the transmission casing, a pair of brackets fixed to the sides of the transmission casing and projecting rearwardly therefrom, a cross bar between the brackets, a drum on said shaft, a brake band disposed about the said drum, a bell crank lever pivotally engaged with one end of the drum, a link pivotally engaged with said bar and pivotally engaged with the intermediate portion of the brake band and means for pivotally engaging the other end of the brake band with an intermediate portion of said link.

6. In combination, a transmission casing, a shaft extending from and operatively connected with the transmission casing, a pair of brackets fixed to the sides of the transmission casing and projecting rearwardly therefrom, a cross bar between the brackets, a drum on said shaft, a brake band disposed about the said drum, a bell crank lever pivotally engaged with one end of the drum, a link pivotally engaged with said bar and pivotally engaged with the intermediate portion of the bell crank, and means for pivotally engaging the other end of the brake band with an intermediate portion of said link, an ear projecting from said bar, and an adjustable stop bolt engaged in said ears with which said link is adapted to engage.

7. In combination, a transmission casing, a shaft extending from and operatively connected with the transmission casing, a pair of brackets fixed to the sides of the transmission casing and projecting rearwardly therefrom, a cross bar disposed between the brackets, a drum on said shaft, a brake band disposed about the said drum, a bell crank lever pivotally engaged with one end of the drum, a link pivotally engaged with said bar and pivotally engaged with the intermediate portion of the bell crank, and means for pivotally engaging the other end of the brake band with an intermediate portion of said link, an ear projecting from said bar, an adjustable stop bolt engaged in said ears with which said link is adapted to engage, a hanger depending from said bar and having a lateral arm at the lower end thereof terminating at the said brake band, and a spring bolt engaging through the arm and pivotally engaged with the brake band.

In testimony whereof I affix my signature.

JOHN A. SMITH.